US012223554B2

(12) United States Patent
Ramanath et al.

(10) Patent No.: US 12,223,554 B2
(45) Date of Patent: Feb. 11, 2025

(54) RECOMMENDATIONS USING SESSION RELEVANCE AND INCREMENTAL LEARNING

(71) Applicant: Microsoft Technology Licensing, LLC, Redmond, WA (US)

(72) Inventors: Rohan Ramanath, Saratoga, CA (US); Konstantin Salomatin, San Francisco, CA (US); Jeffrey Douglas Gee, San Francisco, CA (US); Onkar Anant Dalal, Santa Clara, CA (US); Gungor Polatkan, San Jose, CA (US); Sara Smoot Gerrard, Redwood City, CA (US); Deepak Kumar, Mountain View, CA (US); Rupesh Gupta, Sunnyvale, CA (US); Jiaqi Ge, Sunnyvale, CA (US); Lingjie Weng, Sunnyvale, CA (US); Shipeng Yu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 607 days.

(21) Appl. No.: 16/912,245

(22) Filed: Jun. 25, 2020

(65) Prior Publication Data
US 2021/0406838 A1    Dec. 30, 2021

(51) Int. Cl.
*G06Q 50/00*   (2024.01)
*G06F 16/9535*   (2019.01)
(Continued)

(52) U.S. Cl.
CPC ......... *G06Q 50/01* (2013.01); *G06F 16/9535* (2019.01); *G06F 16/958* (2019.01);
(Continued)

(58) Field of Classification Search
CPC .. G06Q 10/1053; G06Q 50/01; G06F 16/958; G06F 16/9535; G06K 9/6256
(Continued)

(56) References Cited

U.S. PATENT DOCUMENTS 10,984,034 B1 *   4/2021   Sandland ............... G10L 15/183
11,397,924 B1 *   7/2022   Moghaddam ........... G06N 20/00
(Continued)

OTHER PUBLICATIONS

J. Bian, A. Dong, X. He, S. Reddy and Y. Chang, "User Action Interpretation for Online Content Optimization," in IEEE Transactions on Knowledge and Data Engineering, vol. 25, No. 9, pp. 2161-2174, Sep. 2013, doi: 10.1109/TKDE.2012.130. (Year: 2012).*
(Continued)

*Primary Examiner* — Kieu D Vu
*Assistant Examiner* — Nicholas Hasty
(74) *Attorney, Agent, or Firm* — Cantor Colburn LLP; Renee D Brown

(57) ABSTRACT

In some embodiments, a computer system generates a recommendation for a user of an online service based on user actions that have been performed by the user within a threshold amount of time before the generation of the recommendation. For each user action, the computer system determines an intent classification that identifies an activity of the user and that corresponds to different types of user actions, as well as a preference classification that identifies a target of the activity, and then stores these intent and preference classifications as part of indications of the user actions for use in generating different types of recommendations using different types of recommendation models. Additionally, the computer system may use mini-batches of data from an incoming stream of logged data to train an incremental update to one or more recommendation models.

20 Claims, 11 Drawing Sheets

(51) Int. Cl.
G06F 16/958 (2019.01)
G06F 18/214 (2023.01)
G06N 5/04 (2023.01)
G06Q 10/1053 (2023.01)

(52) U.S. Cl.
CPC ............. *G06F 18/214* (2023.01); *G06N 5/04* (2013.01); *G06Q 10/1053* (2013.01)

(58) Field of Classification Search
USPC ......................................................... 706/25
See application file for complete search history.

(56) References Cited

U.S. PATENT DOCUMENTS

| | | | | |
|---|---|---|---|---|
| 2009/0171968 | A1* | 7/2009 | Kane | G06F 16/9535 |
| 2011/0191313 | A1* | 8/2011 | Dupret | G06F 16/24578 |
| | | | | 707/706 |
| 2013/0073400 | A1* | 3/2013 | Heath | G06Q 50/01 |
| | | | | 715/738 |
| 2014/0180788 | A1* | 6/2014 | George | G06Q 50/01 |
| | | | | 705/14.72 |
| 2015/0220555 | A1* | 8/2015 | Wang | G06F 16/9535 |
| | | | | 707/624 |
| 2016/0260112 | A1* | 9/2016 | Irving | G06Q 10/0637 |
| 2019/0019157 | A1* | 1/2019 | Saha | G06N 20/00 |
| 2020/0294070 | A1* | 9/2020 | Nishiguchi | G06Q 30/0204 |
| 2021/0097110 | A1* | 4/2021 | Asthana | H04L 51/02 |

OTHER PUBLICATIONS

"AWS re:Invent 2018: NEW! Introducing Amazon Personalize: Real-time Personalization & Recommendations", Retrieved from: https://www.youtube.com/watch?v=9sexYAHHjxE, Jan. 31, 2019, 3 Pages.

"Uptime and downtime with 99.9 % SLA", Retrieved from: https://uptime.is/99.9, Feb. 2, 2020, 1 Page.

Grbovic, et al., "Real-time Personalization using Embeddings for Search Ranking at Airbnb", Retrieved from: https://www.youtube.com/watch?v=aWjsUEX7B11, Jun. 12, 2018, 3 Pages.

Wu, et al., "RecSys 2016: Paper Session 11—Using Navigation to Improve Recommendations in Real-Time", https://www.youtube.com/watch?v=rYinLmOWRIM, Mar. 30, 2017, 3 Pages.

* cited by examiner

SEARCH FOR JOBS — 620

RECOMMENDED JOBS FOR YOU — 610

SOFTWARE QA ENGINEER
ACME INC.
SAN FRANCISCO, CA
SOFTWARE QA ENGINEER TO PROVIDE SUPPORT TO UNDERSTAND USAGE MODELS AND DEVELOP TEST PLANS ...

SR. SOFTWARE ENGINEER
WAYNE ENTERPRISES
PALO ALTO, CA
2+ YEARS OF EXPERIENCE IN SOA, DATA AND APPLICATION INTEGRATION, WEB SERVICES, ESB ...

SOFTWARE ENGINEER
METROPOLIS CORP.
SAN MATEO, CA
THIS POSITION IS IDEAL FOR C/C++/ANDROID EXPERIENCE. WE ARE LOOKING FOR A HANDS-ON SELF-STARTER ...

SEE MORE ▽

*FIG. 6*

| ACTION | SHORT-TERM PREFERENCE MAP | SHORT-TERM INTENT MAP |
|---|---|---|
| VIEWER STARTS SESSION BY CLICKING AN INVITE FROM MEMBER-1 | {MEMBER-1:1} | {BUILDING_NETWORK:1} |
| VIEWER APPLIES FOR A JOB AT COMPANY-1 | {MEMBER-1:1, COMPANY-1:1} | {BUILDING_NETWORK:1, FINDING_JOB:1} |
| VIEWER FOLLOWS COMPANY-1 | {MEMBER-1:1, COMPANY-1:2} | {BUILDING_NETWORK:2, FINDING_JOB:1} |
| VIEWER LIKES A FEED UPDATE FROM MEMBER-2 | {MEMBER-1:1, COMPANY-1:2, MEMBER-2:1} | {BUILDING_NETWORK:2, FINDING_JOB:1, STAYING_INFORMED:1} |

FIG. 7

Algorithm 1

1: *initialize:*
2:   *Set prior distribution for* $\beta^{(0)} \sim \mathcal{N}(0, \lambda I)$.
3:   *Train global effects model on the initial batch* $\Omega^{(0)}$:
   $$\beta^{(0)} = \{\beta_f^{*(0)}, \beta_r^{*(0)}\}, \beta_r^{*(0)} = \beta_{r,inc}^{*(0)}$$
4:   *Set fixed-effects coefficient to* $\beta_f^{*(0)}$.
5:   *Set posterior distribution for random-effects coefficients to*
   $$\beta_r^{(0)} \sim \mathcal{N}\left(\beta_{r,inc}^{*(0)}, \Sigma_{r,inc}^{*(0)}\right).$$
6:   *Set* $H_r^{(0)} = \nabla^2 F_0(\beta_r^{*(0)})$. *Note,* $\Sigma_{r,inc}^{*(0)} = \left(H_r^{(0)} + \lambda I\right)^{-1}$.
7:   *Set time discount* $\delta < 1$.
8: for *time windows* $t = 1, 2, \ldots$ do
9:   *Prepare new batch of data:* $\Omega^{(t)}$.
10:  *Compute fixed-effect offset:* $\zeta_f = x_f^T \beta_f^{*(0)}, \forall x \in \Omega^{(t)}$.
11:  *Overall regularized log-logistic regression problem:*
   $$\underset{\beta_r}{\text{minimize}} \; \underbrace{\delta F_{t-1}(\beta_r)}_{\substack{\text{time discounted} \\ \text{log-loss on past} \\ \text{observations}}} + \underbrace{f_t(\beta_r)}_{\substack{\text{log-loss on} \\ \text{most recent} \\ \text{observations}}} + \underbrace{\frac{\lambda}{2}\|\beta_r\|_2^2}_{\text{regularization}},$$
12:  *Approximate past log-logistic loss using quadratic approximation around* $\beta_r^{(t-1)}$:
   $$\delta F_{t-1}(\beta_r) = \sum_{k=0}^{t-1} \delta^{t-k} f_k(\beta_r) \approx \frac{\delta}{2} \|\beta_r - \beta_{r,inc}^{*(t-1)}\|_{H_r^{(t-1)}}^2$$
13:  *Solve incremental logistic reg. to compute the posterior mean:*
   $$\beta_{r,inc}^{*(t)} = \underset{\beta_r}{\arg\min} \; \frac{\delta}{2}\|\beta_r - \beta_{r,inc}^{*(t-1)}\|_{H_r^{(t-1)}}^2 + f_t(\beta_r) + \frac{\lambda}{2}\|\beta_r\|_2^2,$$
14:  *Update for Hessian of approximated log-logistic loss:*
   $$H_r^{(t)} = \delta H_r^{(t-1)} + \sum_{x \in \beta^{(t)}} \frac{\exp(\zeta_f + x_r^T \beta_{r,inc}^{*(t)})}{(1+\exp(\zeta_f + x_r^T \beta_{r,inc}^{*(t)}))^2} x_r x_r^T,$$
15:  *Compute the posterior covariance:*
   $$\Sigma_{r,inc}^{*(t)} = \left(H_r^{(t)} + \lambda I\right)^{-1},$$
16:  *Update the model coefficients:*
   $$\beta^{(t)} = \{\beta_f^{*(0)}, \beta_r^{*(t)}\}.$$
17:  *Serve online recommendations using Thompson sampling from updated distribution* $\beta_r^{(t)} \sim \mathcal{N}\left(\beta_{r,inc}^{*(t)}, \Sigma_{r,inc}^{*(t)}\right)$.
18: end for

FIG. 9

RECOMMENDATIONS USING SESSION RELEVANCE AND INCREMENTAL LEARNING

TECHNICAL FIELD

The present application relates generally to systems and methods, and computer program products for providing recommendations using real-time session relevance data and incremental learning.

BACKGROUND

Certain online services provide recommendations of digital content items to their users. In determining what digital content items to recommend to different users, some computer systems of online services use a recommendation model to select which digital content items to recommend. However, current recommendation systems are limited in their ability to provide accurate timely recommendations that are relevant to users, since they employ offline feature data pipelines to personalize recommendations, thereby resulting in delays between the occurrence of user actions that are relevant to recommendations and when the recommendation systems use such user actions as feature data in generating recommendations.

Additional technical problems arise when recommendations systems use machine learning in generating recommendations of digital content items. When observation data comes from high-velocity, user-generated data streams, machine learning methods perform a balancing act between recommendation model complexity, training time, and computational costs. Furthermore, when model freshness is critical, the training of recommendation models becomes time-constrained. Parallelized batch offline training, although horizontally scalable, is often not time considerate or computationally cost-effective. Additionally, current solutions that involve frequent offline model retraining and deployment often prove insufficient, as the computational constraints introduced to train the recommendation model hinders the ability of the underlying computer system to meet self-imposed update frequencies, and a cold-start problem (e.g., encountering entities not observed in the training data) can cause long-term repercussions for the online service, such as poor recurring recommendations influencing future engagement for new or returning users of the online service. Additionally, the performance of the recommendation model slowly degrades over time, demonstrating the need to update the recommendation model continuously.

As a result of these technical deficiencies, the functioning of the computer system of the online service is negatively affected. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 6 illustrates a GUI in which recommendations of online job postings selected using the recommendation system are displayed on a job recommendation page of an online service, in accordance with an example embodiment.

FIG. 7 is a table illustrating user actions building a short-term preference map and a short-term intent map for use in a recommendation system, in accordance with an example embodiment.

FIG. 9 illustrates an incremental learning algorithm for a recommendation system, in accordance with an example embodiment.

DETAILED DESCRIPTION

I. Overview

Figure 1:
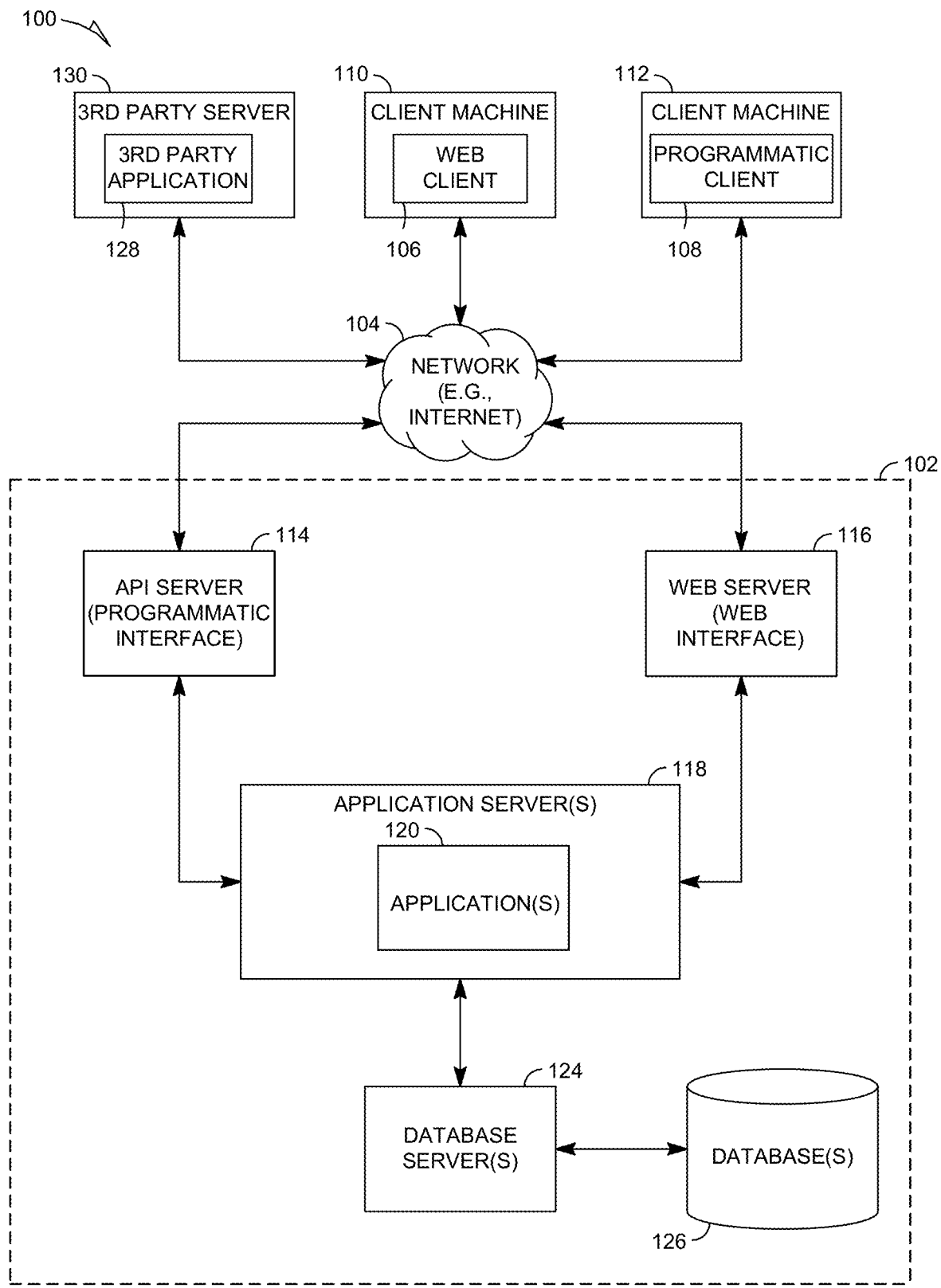
FIG. 1 is a block diagram illustrating a client-server system, in accordance with an example embodiment.

Example methods and systems of providing recommendations using real-time session relevance data and incremental learning are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. The implementation of the features disclosed herein involves a non-generic, unconventional, and non-routine operation or combination of operations. In some example embodiments, a specially-configured recommendation system generates a recommendation for a user of an online service based on user actions that have been performed by the user within a threshold amount of time before the generation of the recommendation (e.g., within the last 24 hours before generating the recommendation). For each user action, the computer system may determine an intent classification (e.g., building a social network, finding a job) that identifies an activity of the user and that corresponds to different types of user actions, as well as a preference classification that identifies a target of the activity (e.g., another user of the online service, a type of job, a specific company), and then store these intent and preference classifications as part of indications of the user actions for use in generating recommendations. The recommendation system may use the same stored indications of user actions to generate different types of recommendations (e.g., connection recommendations, job recommendations) using different types of recommendation models (e.g., connection recommendation model, job recommendation model). By determining the corresponding intent classification and the corresponding preference classification for each user action, the recommendation system can use the same real-time session relevance data across different pages and user interface modules of an online service platform, thereby increasing the applicability of user actions in generating recommendations and improving the accuracy, timeliness, and relevance of the recommendations.

Additionally, the recommendation system may use mini-batches of data from an incoming stream of logged data to train an incremental update to one or more recommendation models. By using incremental learning updates on mini-batches of data streams, the recommendation system provides recommendation models that closely estimate a periodically-updated model trained on offline data and outperform it when recommendation model updates are time-sensitive, as well as improves the loss-function over a stale batch model. Other technical effects will be apparent from this disclosure as well.

II. Detailed Example Embodiments

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third-party. The third-party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
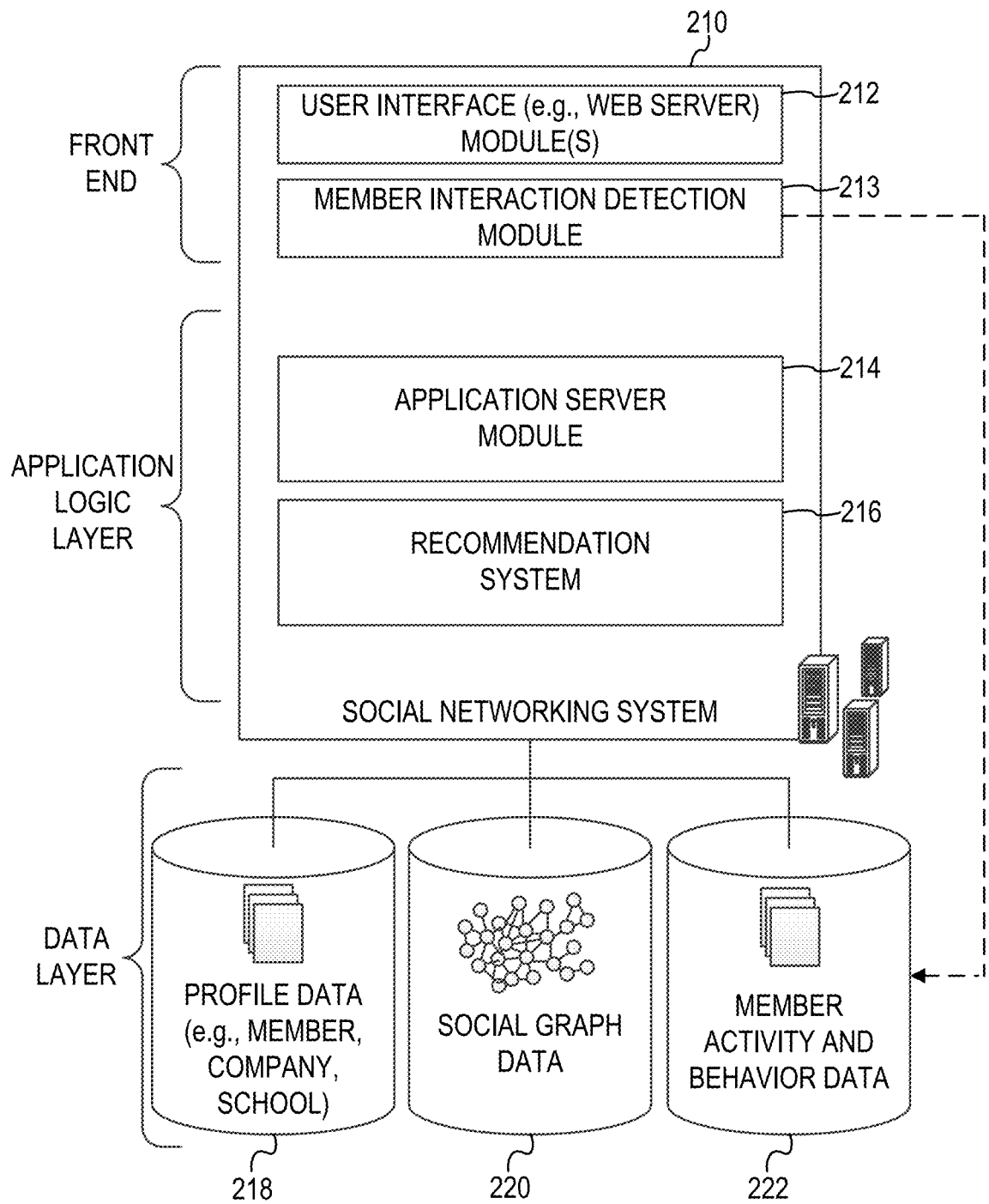
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a recommendation system 216, for use in social networking system 210, consistent with some embodiments of the present disclosure. In some embodiments, the recommendation system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the recommendation system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the recommendation system 216. The members' interactions and behavior may also be tracked, stored, and used by the recommendation system 216 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third-party applications and services.

Although the recommendation system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

In some embodiments, the recommendation system 216 resides on a computer system, or other machine, having a memory and at least one processor (not shown). The recommendation system 216 may be incorporated into the networked system 102, such as in the application server(s) 118 in FIG. 1. In some example embodiments, the recommendation system 216 includes, or is otherwise in communication with, any combination of one or more of databases 218, 220, and 222 in FIG. 2. Other configurations of the recommendation system 216 are also within the scope of the present disclosure.

In some example embodiments, the recommendation system 216 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, the recommendation system 216 is configured to receive user input. For example, the recommendation system 216 can present one or more GUI elements (e.g., drop-down menu, selectable buttons, text field) with which a user can submit input.

In some example embodiments, the recommendation system 216 is configured to perform various communication functions to facilitate the functionality described herein, such as by communicating with the social networking system 210 via the network 104 using a wired or wireless connection. The recommendation system 216 may also provide various web services or functions, such as retrieving information from the third party servers 130 and the social networking system 210. Information retrieved by the recommendation system 216 may include profile data corresponding to users and members of the social networking service of the social networking system 210.

Additionally, the recommendation system 216 can provide various data functionality, such as exchanging information with databases or servers. For example, the recommendation system 216 can access member profiles that include profile data from databases, such as from the database 218, as well as extract attributes and/or characteristics from the profile data of member profiles. Furthermore, the recommendation system 216 can access social graph data and member activity and behavior data from databases, such as the databases 220 and 222, as well as exchange information with third party servers 130, client machines 110, 112, and other sources of information.

Figure 3:
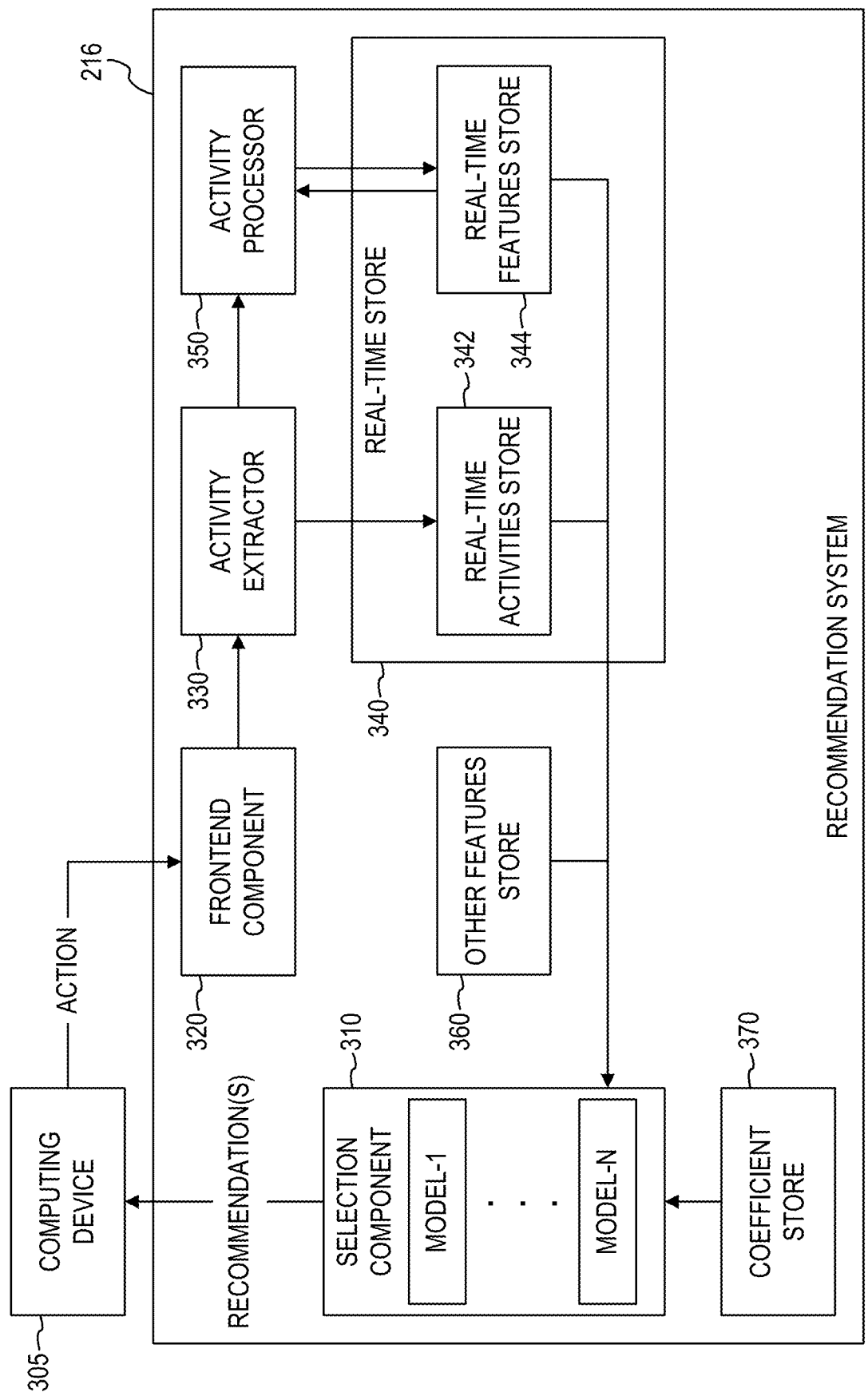
FIG. 3 is a block diagram illustrating components of a recommendation system, in accordance with an example embodiment.

FIG. 3 is a block diagram illustrating components of a recommendation system 216, in accordance with an example embodiment. In some embodiments, the recommendation system 216 comprises any combination of one or more of a selection component 310, a frontend component 320, an activity extractor 330, a real-time store 340, an activity processor 350, an other feature store 360, and a coefficient store 370. The recommendation system 216 can reside on a computer system, or other machine, having a memory and at least one processor (not shown). In some embodiments, the recommendation system 216 can be incorporated into the application server(s) 118 in FIG. 1. However, it is contemplated that other configurations of the recommendation system 216 are also within the scope of the present disclosure.

In some example embodiments, the recommendation system 216 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, the recommendation system 216 is configured to receive user input. For example, the recommendation system 216 can present one or more GUI elements (e.g., drop-down menu, selectable buttons, text field) with which a user can submit input.

In some example embodiments, the recommendation system 216 is configured to perform various communication functions to facilitate the functionality described herein, such as by communicating with the social networking system 210 via the network 104 using a wired or wireless connection. The recommendation system 216 may also provide various web services or functions, such as retrieving information from the third party servers 130 and the social networking system 210. Information retrieved by the recommendation system 216 may include profile data, social graph data, and member activity and behaviour data corresponding to users and members of the social networking service of the social networking system 210.

In some example embodiments, the selection component 310 is configured to generation one or more recommendations for a user of an online service. The selection component 310 may cause the generated recommendation(s) to be displayed on a computing device 305 of the user. In some example embodiments, the selection component 310 may use different recommendation models (e.g., MODEL-1, . . . , MODEL-N) to generate different types of recommendations, such as a connection recommendation model to generate a connection recommendation for the user and a job recommendation model to generate job recommendations for the user.

Figure 4:
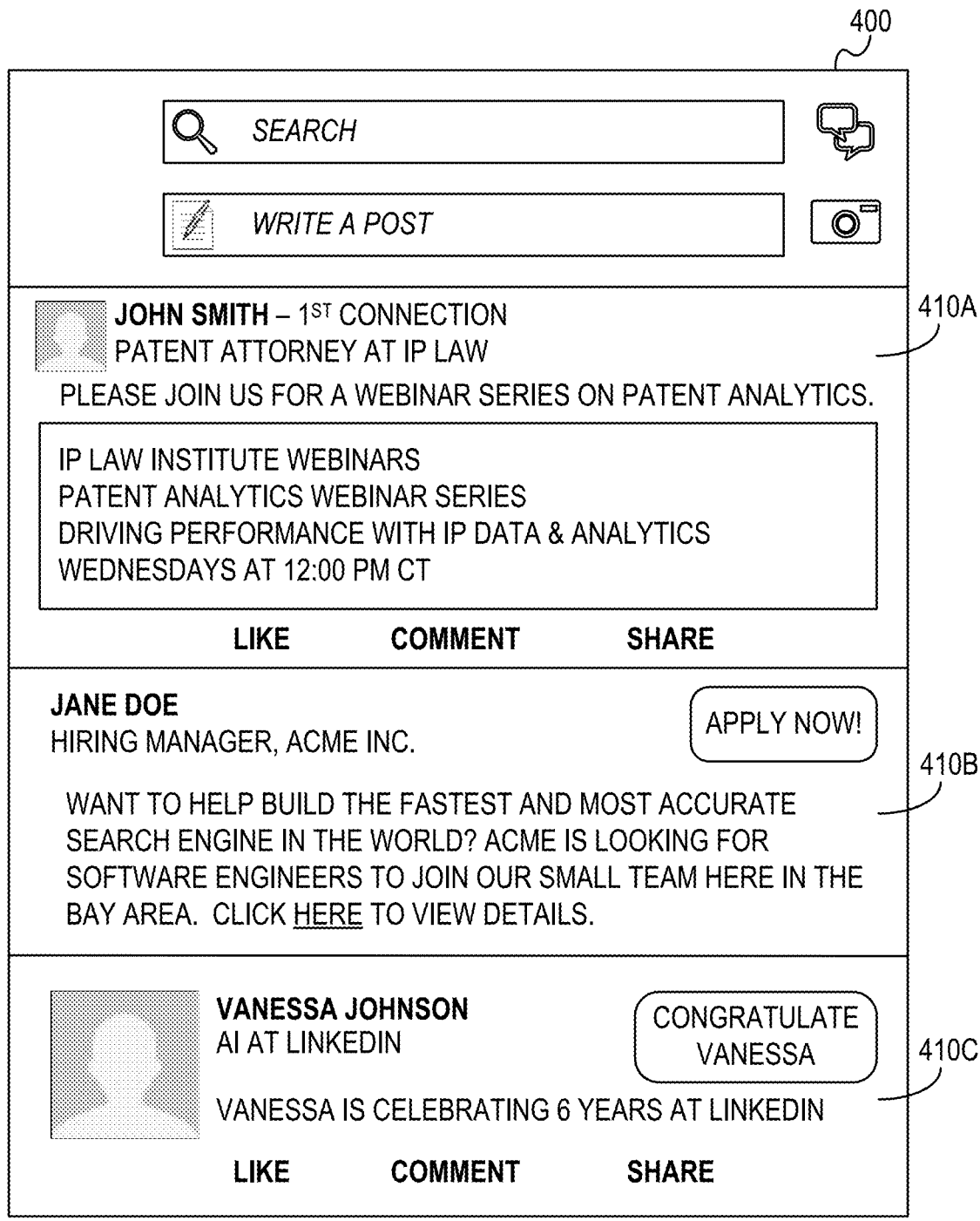
FIG. 4 illustrates a graphical user interface (GUI) in which a personalized feed of a user is displayed on a home page of an online service, in accordance with an example embodiment.

FIG. 4 illustrates a graphical user interface (GUI) 500 in which a personalized feed of a user is displayed on a home page of an online service, in accordance with an example embodiment. The personalized feed of the user comprises digital content items 410 of different types. For example, in FIG. 5, the personalized feed comprises a first digital content item 410A of a first type, a second digital content item 410B of a second type different from the first type, and a third digital content item 410C of a third type different from both the first type and the second type. The digital content items 410 displayed as part of the personalized feed may be generated by the recommendation system 216. In some example embodiments, the selection component 310 uses a feed recommendation model to generate the recommendations to be displayed in the personalized feed of the user. Although the feed recommendation model may leverage output from other recommendation models in generating recommendations to be displayed in the personalized feed of the user, such as output from a connection recommendation model and output from a job recommendation model, the feed recommendation model may still be considered its own discrete model.

Figure 5:
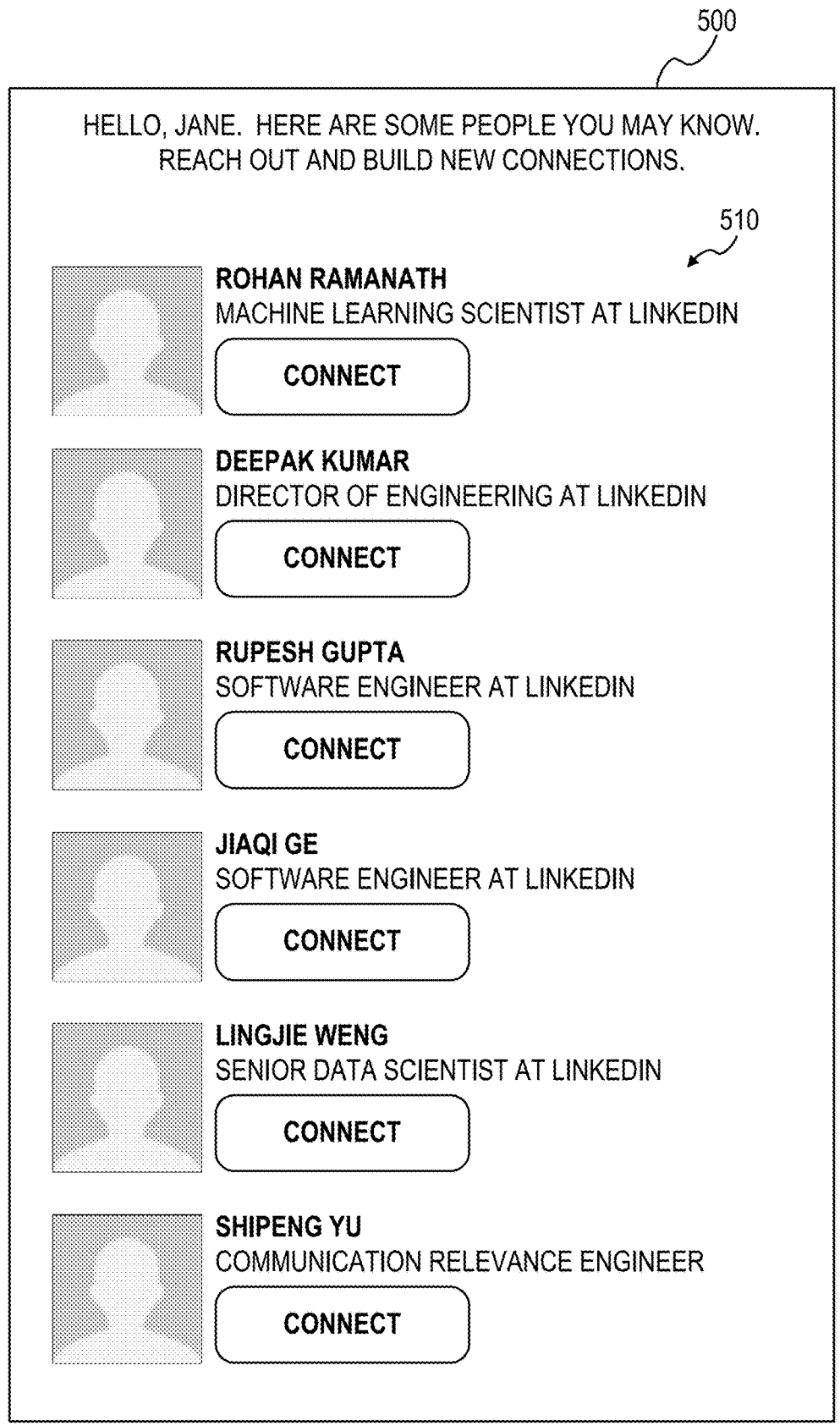
FIG. 5 illustrates a GUI in which recommendations of connections with other users selected using the recommendation system are displayed on a connection recommendation page of an online service, in accordance with an example embodiment.

FIG. 5 illustrates a GUI 500 in which recommendations 510 of connections with other users selected using the recommendation system 216 are displayed on a connection recommendation page of an online service, in accordance with an example embodiment. In FIG. 5, each recommendation 510 may comprise an identification of the corresponding recommended other user, an image associated with a profile of the corresponding recommended other user, one or more attributes of the corresponding recommended other user (e.g., job position, company), and a selectable user interface element (e.g., a clickable "CONNECT" button) configured to cause a user-to-user message (e.g., an invitation to connect) to be transmitted to the corresponding recommended other user or to cause another type of user action to be performed. Each recommendation 510 may also comprise a selectable user interface element (not shown) configured to reject or otherwise dismiss the corresponding recommendation, so as to indicate an instruction by the user not to perform the user action for the corresponding recommended other user of the corresponding recommendation. The recommendations 510 of connections may be generated using a type of recommendation model dedicated to generating only recommendations 510 of connections.

FIG. 6 illustrates a GUI 600 in which recommendations 610 of online job postings selected using the recommendation system 216 are displayed on a job recommendation page of an online service, in accordance with an example embodiment. In some example embodiments, the online job postings are published on the online service, and the recommendations 610 are caused to be displayed to the user on the computing device of the user. The recommendations 610 may each comprise one or more corresponding selectable user interface elements (e.g., hyperlinked text) configured to display more information about the corresponding online job posting of the recommendation 610 (e.g., to view the entire online job posting rather than just an abbreviated summary of the online job posting) or to enable the user to perform some other type of online action directed towards the online job posting of the recommendation 610, such as saving the online job posting or applying to the online job posting. Each recommendation 610 may include information about the corresponding online job posting, such as a job title, a company name, a geographical location, and desired skills, educational background, and work experience. Other types of information may also be included in the recommendation 610. The GUI 600 may also display one or more user interface elements 620 configured to enable the user to submit a search query for searching for online job postings, such as by entering keyword search terms into a search field. In response to one or more keywords being submitted by the user as part of a search query via the search field, the recommendation system 216 may generate recommendations 610 based on the keyword(s) and feature data of online job postings being evaluated as search results. The recommendations 610 of online job postings may be generated using a type of recommendation model dedicated to generating only recommendations 610 of online job postings.

In some example embodiments, the recommendation system 216 is configured to determine the short-term intent and preferences of the user based on real-time processing of actions of the user, where the intent of the user comprises an activity of the user and corresponds to different types of user actions, and the preferences of the user comprise one or more targets of the activity. When the user takes an action on the computing device 305, the computing device 305 makes a call to the frontend component 320. Examples of user actions include, but are not limited to, posting a comment for a digital content item posted by another user, sending an invitation to connect to another user, following another user, submitting an electronic like of a digital content item posted by another user, sharing a digital content item posted by another user, sending a message to another user, viewing an online job posting via the online service, and applying to an online job posting via the online service. Other types of user actions are also within the scope of the present disclosure.

The frontend component 305 determines if the user action is worth recording in the real-time store 340. For example, certain actions may be determined to not be indicative of the user's short-term interests or preferences. In some example embodiments, the frontend component 320 uses at least one of a whitelist of user actions to determine which user actions to record in the real-time store 340 for use as real-time relevance data in generating recommendations. If the frontend component 320 determines that a user action is worth recording, such as based on a determination that the user action is on the whitelist, then the frontend component 320 makes a to call to the activity extractor 330, which extracts the raw action data from an event object triggered by the user action. The real-time store 340 may comprise a real-time activities store 342 configured to store raw data and a real-time features store 344 configured to store feature data corresponding to the raw data, such as a vector representation based on the raw data. The raw action data is stored in the real-time activities store 342 with a fixed time-to-live. Upon receiving the raw action from the activity extractor 330, the activity processor 350 reads the latest real-time feature data of the user from the real-time features store and modifies it based on the new user action. The new feature data are written back to the real-time features store 344 along with their last modified time and time-to-live.

In some example embodiments, the raw data stored in the real-time activities store 342 and the feature data stored in the real-time features store 344 comprise corresponding indications of the user action. Each indication of a user action may comprise an intent classification and a preference classification for the corresponding user action. The intent classification identifies an activity of the user. In some example embodiments, the storing of the corresponding indication of the user action comprises selecting the corresponding intent classification from a plurality of intent classifications based on the corresponding user action. The plurality of intent classifications may comprise building a social network, finding a job, staying informed, and nurturing a relationship. However, the plurality of intent classifications may comprise other configurations of intent classifications. In some example embodiments, each intent classification corresponds to a plurality of different types of user actions. For example, one intent classification may be finding a job, which corresponds to the user actions of viewing an online job posting, saving an online job posting, and applying to an online job posting.

In some example embodiments, the preference classification identifies a target of the activity. The storing of the corresponding indication of the user action may comprise selecting the corresponding preference classification from a plurality of preference classifications based on the corresponding user action. The plurality of preference classifications may comprise another user of the online service, a type of job, a specific company, a type of company, an industry, and a geographic location. However, the plurality of preference classifications may comprise other configurations of preference classifications.

The recommendation system 216 may use the user actions to build a short-term preference map and a short-term intent map for the user. FIG. 7 is a table 700 illustrating user actions 710 building a short-term preference map 720 and a short-term intent map 730 for use in a recommendation system, in accordance with an example embodiment. In FIG. 7, the table shows a user action 710 of the user starting a session by clicking on an invitation to connect from a first other user (e.g., MEMBER-1) resulting in an indication in the short-term preference map 720 of a short-term preference for the first other user, as well as an indication in the short-term intent map 730 for building a network (e.g., BUILDING_NETWORK). Next, a user action 710 of the user applying to an online job posting at a company (e.g., COMPANY-1) results in an indication in the short-term preference map 720 of a short-term preference for the company, as well as an indication in the short-term intent map 730 for finding a job (e.g., FINDING JOB). Then, a user action 710 of the user following the company results in another indication in the short-term preference map 720 of a short-term preference for the company (e.g., COMPANY-1), as well as another indication in the short-term intent map 730 for building a network (e.g., BUILDING_NETWORK). Next, a user action 710 of the user liking a feed update from a second other user (e.g., MEMBER-2) results in an indication in the short-term preference map 720 of a short-term preference for the second other user, as well as an indication in the short-term intent map 730 for staying informed (e.g., STAYING_INFORMED).

In FIG. 7, the short-term preference map 720 and the short-term intent map 730 show a raw count being maintained for each respective preference classification and intent classification, where the raw count follows the colon (":"). In some example embodiments, the recommendation system 216 processes these raw counts to generate vector representations of the short-term preference map 720 and the short-term intent map 730, which may be stored in the real-time features store 344 as real-time feature vectors. The selection component 310 may use these real-time feature vectors from the real-time features store 344 or the raw action data from the real-time activities store 342, along with one or more other feature data from the other features store 360 (e.g., profile data of the user, social graph data of the user, information about subject of digital content item to be recommended) to generate a recommendation for the user based on a recommendation model. In some example embodiments, the selection component 310 selects, from amongst a plurality of recommendations models of the online service, the recommendation model to use in generating the recommendation for the user. For example, the plurality of recommendation models may comprise a model configured to be used to generate recommendations of digital content items to be displayed within a personalized feed of the user on the home page, another model configured to be used to generate recommendations of other users with whom to form connections, and yet another model configured to be used to generate recommendations of online job postings. In some example embodiments, the recommendation system 216 selects the recommendation model based on an identification of a particular page or user interface module (e.g., a particular bounded area within a page dedicated to display of a particular type of recommendation) in which the recommendation is to be provided.

In some example embodiments, the recommendation system 216 records raw actions of users as (actor, verb, object) tuples. For example, (member:2, invited, member:3). A record of an action may be available for processing and use in generating recommendations for a user within 30 seconds after the action is performed by the user. The recommendation system 216 may select the objects in the action tuples to include in the short-term preference map 730, and may select the verbs in the action tuples to include in the short-term intent map 720.

The selection component 310 uses the stored indications of the user actions as feature data for the recommendation model based on the user actions having been performed within a threshold amount of time before the point in time at which the recommendation is generated. For example, the recommendation system 216 may filter out any indications of user actions not performed within the last 24 hours, and then use only the indication user actions performed within the last 24 hours as feature data for the recommendation model in generating the recommendation.

In some example embodiments, the selection component 310 causes the generated recommendation to be displayed on the computing device 305. The selection component 310 may cause recommendations of different recommendation models to be displayed on different pages of the online service, even though the same indications of user actions are used to generate the different recommendations. For example, one or more recommendations may be generated based on a feed recommendation model using the stored indications of user actions and displayed on a home page of the online service that is displayed on the computing device 305 of in response to the user logging onto the online service (e.g. on the home page shown in FIG. 4), and one or more other recommendations may generated by another type of recommendation model (e.g., a connection recommendation model, a job recommendation model) and displayed on any other page of the online service that is navigated to from the home page via selection by the user of at least one selectable link (e.g., on the connection recommendation page shown in FIG. 5, on the job recommendation page shown in FIG. 6).

In generating recommendations for a user, the selection component 310 may prioritize recommendations of digital content items from the entities that are present in the short-term preference map 720 for the user, as well as prioritize recommendations of digital content items that satisfy the user's short-term intent based on the short-term intent map 730. In some example embodiments, the recommendation system 216 may analyze the user action to infer additional preferences of the user based on similarities or connections between the target of the user action and additional entities. In one example, the user starts a session with the online service by clicking an invitation to connect from another user labeled MEMBER-1. MEMBER-1:1 is added to the short-term preference map 720. Now, for every user (MEMBER-J) in the user's social network (e.g., every other user connected to the user in the user's social graph), the recommendation system 216 may compute a similarity value s (e.g., such as a percentage) between the feature vector of MEMBER-1 and the feature vector of MEMBER-J, and then add MEMBER-J: s to the short-term preference map.

In some example embodiments, the selection component 310 uses one or more coefficients stored in the coefficient store 370 in generating the recommendation. The coefficients are used by the selection component 310 as weights for the feature data used by the recommendation model in generating the recommendation. In generating recommendations, the selection component 310 may use Generalized Additive Mixed Effect (GAME) models, which comprise a large fixed-effects model that is trained on a whole dataset to learn the probability of engagement for a particular viewer and content, as well as a series of simpler linear random-effects models trained on data corresponding to each entity (e.g., per-viewer or per-content) for more granular personalization. The fixed-effects part of the model can be arbitrarily complex (e.g., wide & deep, boosted trees, ensembles, or linear) depending on the targeted task. The random-effect models are a powerful way to personalize both member and content patterns. However, in cases where models are fit to incredibly large datasets, the additional model-complexity comes with large computational costs.

Furthermore, to model newly introduced content or content with short-lived significance, computation time becomes a valuable commodity, and limiting it causes a computationally-constrained learning problem. For example, a new advertising campaign can reach thousands of impressions in a few minutes. Similarly, a job posting can reach millions of job seekers in a short time window. In these cases, recommendation models need to learn from the information as quickly as possible. Specifically, a cold start problem and a data shift problem have been observed when estimating viewer engagement. In an example of the cold start problem, over the course of a day, users of the online service encounter advertisers and advertisements that are not observed in the training set. These digital content items can be brand-new advertisers and advertisements, or advertisers who have not marketed through the online service for extended periods of time. Under these scenarios, random-effect models must quickly adapt to new data. In an example of the data shift problem, viewers' most recent engagements are the best interest indicators, as interest can dramatically shift over short periods of time. For example, a viewer who might be heavily engaging with advertisements about cloud services on the online service may be less inclined to engage immediately after signing up with some of the cloud services.

Solutions such as frequent offline model retraining and deployment often proves insufficient for the following reasons. First, the computational constraints introduced to train the model disallows the recommendation system 216 from meeting self-imposed update frequencies. Second, the cold-start problem can cause long-term repercussions for the online service, such as poor recurring recommendations influencing future engagement for new or returning dormant members. Additionally, the model performance slowly degrades over time, demonstrating the need to update the model continuously. In some example embodiments, the recommendation system 216 implements a framework to incrementally train a recommendation model, incrementally updating models between full batch offline updates of the recommendation model to best balance performance against stability.

In some example embodiments, the recommendation system 216 prepares mini-batches of data from an incoming stream of logged data to train an incremental update to the coefficients of the recommendation model stored in the coefficient store 370. Since technical problems arise in holding the entire dataset (e.g., all historical data) in memory, the recommendation system 216 may approximate the loss function on previously observed data by a local quadratic approximation around the previous optimal and combine it with the loss function on the most recent mini-batch. This approach results in a regularized learning problem with a weighted penalty. In the Bayesian interpretation, the local quadratic approximation is equivalent to using the posterior distribution of the previous model as prior for training the update.

The present disclosure uses the following notation We refer to a training dataset $\Omega^{(t)}$ as the mini-batch/slice of ordered "data instances" observed in time interval t. Each $\Omega^{(t)}$ consists of data instances represented by the tuple $(x_n, y_n)$, where $x_n$ is an observed feature vector describing instance n, and $y_n$ is a corresponding observed label. We denote the cumulative training dataset observed until time t using $\overline{\Omega}^{(t)} = \overline{\Omega}^{(t-1)} \cup \Omega^{(t)}$. We use $\beta^{*(t)}$ to refer to a parameterized model trained on the full dataset $\overline{\Omega}^{(t)}$, and $\beta_{inc}^{(t)}$ to refer to the incremental model trained using the incremental learning framework of the present disclosure.

In the GAME framework, the model $\beta = [\beta_f, B]$ consists of two components: a fixed-effects model, $\beta_f$, and a set of random-effect models, $B = \{B_r\}_{r \in R}$, where R denotes the set of random-effect types. Coefficients of a single random-effect type r are denoted by $B_r = \{B_{rl}\}_{l=1}^{N_r}$, where $N_r$ is the total number of random-effects with random-effect type, r (e.g., r may correspond to per-viewer, per-content, or per-job; and l is a specific viewer, content or job, and $N_r$ is the number of viewers, content, or jobs). Lastly, for each data instance $x_n, y_n$, we use i(r,n) to represent the index value of random-effect type r for instance n.

Given a stream of observation data $\Omega^{(0)}, \Omega^{(1)}, \ldots, \Omega^{(t)}, \ldots$, and a base convex loss function $f$ (e.g., log-logistic), we define a series of loss functions over the mini-batch of datastream $\Omega^{(t)}$ as $$f_t(\beta) = \sum_{n \in \Omega^{(t)}} f(x_n, y_n, \beta),$$

and a time-discounted cumulative loss over the total data $\overline{\Omega}^{(t)}$ $$F_t(\beta) = \sum_{k=0}^{k=t} \delta^{t-k} f_k(\beta) = \delta F_{t-1}(\beta) + f_t(\beta),$$

where $\delta < 1$ is a time discount or forgetting factor to emphasize the fresher data.

Generalized Linear Mixed (GLMix) models may be used as an approach for personalizing traditional Generalized Linear Models (GLM's) through the addition of linear random-effects models keyed to discretely valued random effect variables. Example random-effects variables range from unique entity identifiers (e.g., advertisement, job, member) to contextual information, such as the consumption device (e.g., desktop, mobile application, etc.). In practice, the coefficients may fit conditionally on the presence of these variables and serve a supplementary role in providing personalization atop the GLM.

In some example embodiments, the recommendation system 216 solves for the fixed-effect coefficients, $\beta_f$, and the random-effect coefficients, B, through the optimization of $$\underset{\beta=[\beta_f, B]}{\text{minimize}} \sum_{n \in \overline{\Omega}} -\log p(y_n | s_n) - \log p(\beta_f) - \sum_{r \in R} \sum_{l=1}^{N_r} \log p(\beta_{rl})$$

where $s_n$ is defined as $$s_n = x_n^T \beta_f + \sum_{r \in R} z_m^T \beta_{r,i(r,n)},$$

with $x_n$ representing the feature vector for the fixed-effect on sample n, $z_{rn}$ representing the feature vector for random-effects type r on n, and $\beta_{r,i(r,n)}$, corresponding to the coefficients of the random-effects value i(r,n). The probability terms log $p(\beta_f)$ and log $p(\beta_{rl})$ results from a standard Gaussian prior $N(0, \lambda I)$ on all the coefficients.

Although the GLMix formulations in the preceding two equations above describe fixed-effects and random-effects coefficients as linear models, they are not limited to such. By substituting $s_n$ for:

$$s_n = g_f(x_n, \beta_f) + \sum_{r \in R} g_r(z_m, \beta_{r,i(r,n)}),$$

we define the GAME model class, where $g_f$ and $g_r$ are scoring functions parameterized by fixed and random-effects models respectively. For example, $g_f$ can be a deep neural network or a bag of decision trees. GLMix is a linear example of GAME.

Incremental learning describes the general set of algorithms attempting to solve large-scale machine learning through immediate model updates in response to new data instances without additional passes over pre-existing data. These scenarios occur when training models on large streams of data, where there is a limited time window for models to adjust, constraining computational cost of the learning process. Model update rates can be controlled over batch sizes of new observations (e.g., incremental batch learning) with a batch size of 1 corresponding to online learning.

In some example embodiments, the recommendation system 216 provides an efficient solution for updating the random-effects model as fresher data flows. One aspect is the parallelization of random-effects model training, which is possible when data instances are grouped by random-effects values.

For every batch of data $\Omega^{(t)}$, the recommendation system 216 may solve the problem $$\underset{\beta}{\text{minimize}}\, F_t(\beta) - \log p(\beta),$$

where $p(\beta)$ is the prior distribution of the model parameters $\beta$. Assuming a Gaussian prior $p(\beta) \sim N(0, \lambda I)$, in the case of log-logistic loss, the output of the problem is a Gaussian posterior distribution $p_t(\beta) \sim N(\beta^{*(t)}, \Sigma^{*(t)})$ (using Laplace approximation).

However, as the data size grows, it is increasingly difficult to hold it all in memory and computationally intensive to iterate over the entire data set for computing full $F_t$, $\nabla F_t$, and/or $\nabla^2 F_t$. Therefore, the recommendation system 216 may maintain an approximation of the loss function over the past observations, $F_{t-1}$, and combine it with the loss function over the latest batch $f_t$. In particular, the recommendation system 216 may split the problem into the loss on the historical data and the loss on incremental batch, $$\underset{\beta}{\text{minimize}}\, \delta F_{t-1}(\beta) + f_t(\beta) - \log p(\beta),$$

The first term of objective function can be approximated using a quadratic function centered around previous optimum $\beta^{*(t-1)}$, $$\underset{\beta}{\text{minimize}}\, \frac{\delta}{2}\|\beta - \beta^{*(t-1)}\|^2_{\nabla^2 F_{t-1}(\beta^{*(t-1)})} + f_t(\beta) + \frac{\lambda}{2}\|\beta\|^2.$$

The optimality of $\beta^{*(t-1)}$ implies $\nabla F^{t-1}(\beta^{*(t-1)}) = 0$ (hence, the linear term is dropped). In the Bayesian framework, since $(\Sigma^{*(t-1)})^{-1} = \nabla^2 F_{t-1}(\beta^{*(t-1)})$, this approximate problem is equivalent to training the mini-batch using the posterior distribution, $N(\beta^{*(t-1)}, \Sigma^{*(t-1)})$, from the previous step as a prior distribution for $\beta^{(t)}$.

Additionally, in the GAME framework, the recommendation system 216 may use asynchronous updates for the random-effect models to keep them fresh in production systems. The recommendation system 216 may control the rate at which a random-effects model is updated by a mini batch-size parameter. Once a sufficiently-sized batch of data $\Omega_{\bar{r}\bar{l}}^{(t)} = \{n \in \Omega^{(t)} | i(\bar{r}, n) = \bar{l}\}$, for random-effect $\bar{r}$ and index $\bar{l}$, has been observed, the recommendation system 216 updates the corresponding random-effect by solving:

$$\underset{\beta_{\bar{r}\bar{l}}^{(t)}}{\text{minimize}} \sum_{n \in \Omega_{\bar{r}\bar{l}}^{(t)}} -\log(y_n \mid \zeta_n^{(t-1)} + z_{\bar{r}n}^T \beta_{\bar{r}\bar{l}}^{(t)}) - \delta \log p(\beta_{\bar{r}\bar{l}}^{(t)})$$

$$\zeta_n^{(t-1)} = x_n^T \beta_f^{*(0)} + \sum_{s \in R, r \neq \bar{r}} z_{rn}^T \beta_{r,i(r,n)}^{(t-1)},$$

and the posterior distribution for $\beta_{\bar{r}\bar{l}}^{(t-1)}$, i.e., the Gaussian distribution $N(\beta^*_{\bar{r}\bar{l}}^{(t-1)}, \Sigma^*_{\bar{r}\bar{l}}^{(t-1)})$ is used as the prior distribution $p(\beta_{\bar{r}\bar{l}}^{(t)})$. The recommendation system 216 may keep the fixed-effect model, $\beta^*_f^{(0)}$, stationary throughout the incremental training process and use the updated model $\beta^{*(t)} = [\beta^*_f^{(0)}, \{B^*_r^{(t)}\}_{r \in R}]$ to serve traffic after time t.

Figure 8:
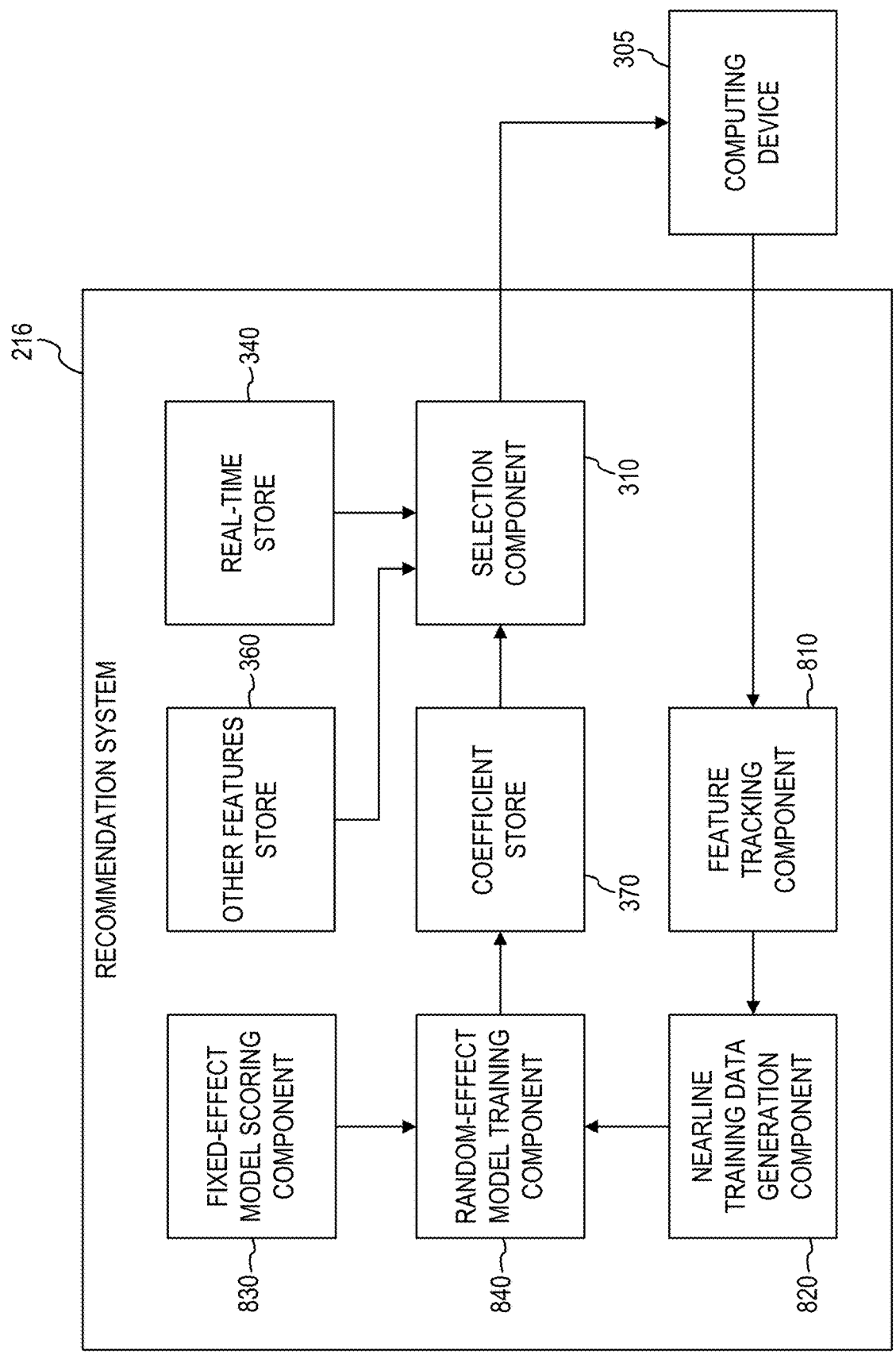
FIG. 8 is a block diagram illustrating components that implement incremental learning in a recommendation system, in accordance with an example embodiment.

FIG. 8 is a block diagram illustrating components that implement incremental learning in the recommendation system 216, in accordance with an example embodiment. In some example embodiments, the recommendation system 216 comprises a feature tracking component 810, a nearline training data generation component 820, a fixed-effects model scoring component 830, and a random-effects model training component 840.

Although the fixed-effects and random-effects models may be retrained offline as often as possible, only restricted by the time cost to complete one full training session, in practice, it has been observed to take anywhere between 8-24 hours depending on the size of the data and the complexity of the recommendation model. The frequency of updating the random-effect coefficients B (e.g., the coefficients stored in the coefficient store 370) is restricted by the time required to process the data and train the random-effects models, which is largely proportional to the size of the training data, which is itself a function of the time intervals, T. The recommendation system 216 may use the incremental learning framework of the present disclosure to reduce the time required to adapt to the nearline observations by processing incremental data and learning on sequences of micro-batches.

In some model training pipelines, labeled data instances ("observations") are joined with offline stores of uniquely keyed features (e.g., member features, ad features, etc.) to produce the training data, $\Omega$. Models trained through this method are applied on-demand through an online serving layer, where feature producer functions produce a real-time representation of $x_n$ prior to being scored with the model. However, there are technical problems with this approach, such as differences between offline/online feature productions (e.g., due to bugs, versioning, unavailability, etc.), as well as the temporal aspect of certain feature sets. Training pipelines that rely on the present value of time sensitive features (e.g., activity-based features) can cause severe overfitting, and, in the worst-cases, introduce label information into training data.

As a technical solution, in some example embodiments, the recommendation system 216 employs an online feature tracking system in the form of the feature tracking component 810 that tracks the feature values when the response prediction service scores a digital content item (e.g., an advertisement) for recommendation using an open-source stream-processing software platform that is used to serve real-time data for online services. Feature tracking guarantees feature parity since feature values are acquired in a single fetch. For online services that already score and fetch features on-demand, the amount of additional work to log feature values is very low.

In some example embodiments, an open-source stream-processing software platform of the online service provides topics such as impressions, clicks, and tracked raw data. Machine learning applications may use aggregates or derived statistics from this raw data. The nearline training data generation component 820 listens to multiple topics and produces featurized training examples. Next, the nearline training data generation component 820 publishes to a new topic, which is processed through an extract, transform, load (ETL) layer and dumped to storage for offline consumption.

As part of the processing logic, the job is the single source of truth for label cleaning, attribution as well as stream-table joins to enrich the data using external datasets. Features that are fairly static, but dense (e.g., embeddings of static entities) are good candidates to be introduced at this stage since it is cost-inefficient to log highly redundant, dense features.

Two knobs that may be fine-tuned by analyzing traffic patterns for data quality are: (1) trade-off between training cost and accuracy, and (2) scale for high throughput. With respect to the trade-off between training cost and accuracy, since offline data pipelines have access to "delayed" clicks while preparing the training data, all the clicks are accounted for. In the streaming case, the use of windowing limits the clicks that would be considered for training. The longer the window, the higher the cost and lower the rate of missed data. With respect to scale for high throughput, the system has to process the input events fast enough so that the storage used for queuing the events will not exceed capacity. The data processing is designed to minimize data shuffle across the network to ensure scalability. This solution also ensures that all the data corresponding to an advertiser is processed on the same node.

In some example embodiments, the fixed-effect model scoring component 830 comprises a stream processor that listens on a stream of training data and scores each incoming instance with the fixed-effects model parameterized by $\beta_f^{(0)}$. If the fixed-effects model is an ensemble, the entire ensemble is scored just like it would be online to compute a score for every impression. The score serves as the offset for random-effects training, as will be explained in further detail below with respect to Algorithm 1 of FIG. 8. The stream processor of the fixed-effect model scoring component 830, at this stage, batches the incoming data keyed by the random-effect identification (e.g., advertiser) and with configurable triggers (e.g., based on impressions, time since last update or coefficient variance) to kick start an incremental model training.

The random-effect model training component 840 performs incremental model training using an incremental learning algorithm. FIG. 9 illustrates an incremental learning algorithm (Algorithm 1) for the recommendation system 216, in accordance with an example embodiment. In lines 2-7 of the incremental learning algorithm in FIG. 9, the random-effect model training component 840 initializes the parameters and train the fixed and random effect models with batch data. In production systems, this initial set of training may be performed in an offline system and models may be deployed to online services. In lines 9-10 of the incremental learning algorithm in FIG. 9, the random-effect model training component 840 gets the next mini-batch data and computes the offset coming from the fixed-effect model of the fixed-effect model scoring component 830. The recommendation system 216 may maintain the same stationary $\beta_f^{(0)}$ for all t. The offset provides the connection of the fixed-effects model with the random-effects model (e.g., the coefficients of the random-effects model) that are to be updated. This approach enables the recommendation system 216 to use any other parametric machine learning model for fixed-effect representation, such as a deep neural network or a boosted decision trees. In lines 11-16 of the incremental learning algorithm in FIG. 9, the random-effect model training component 840 retrains the incremental models to update the posterior distribution. For online serving, the random-effect model training component 840 may use $\beta_f^{(0)}$ and Thompson Sampling from the updated distribution for $\beta_r^{(t)}$. For each mini-batch of data $\Omega^{(t)}$, the random-effect model training component 840 solves the inner loop of Algorithm 1 in FIG. 9 to update $\beta*_r^{(t)}$ and $\Sigma*_r^{(t)}$. The learned coefficients may be written to a read-write key-value store, such as the coefficient store 370, from which the selection component 310 may read at recommendation request time.

The recommendation system 216 may provide an advertising platform in which customers can target hundreds of millions of members of the online service via digital content items comprising sponsored updates. The recommendation models of the recommendation system 216 play a central role to score these digital content items by estimating the engagement rate of members. The production system for the recommendation models can be logically separated into two phases: (1) the cold start phase where the fixed-effects part of the GAME model is trained, and (2) the warm start phase trains random-effects coefficients per ad to boost the scores of the fixed-effects model. The fixed-effects model training identifies a member's engagement, propensity to click, and interactivity within the online service's ecosystem through attributes of their profile, historical behavior, and contextual cues. These fixed-effects models are typically large non-linear models periodically retrained using logged historical data. The warm start models capture information specific to the ad, campaign, and advertiser. These random-effects models provide fine-grained modeling control at different levels of granularity.

Since the random-effects training is for every individual advertiser, it can be trained incrementally to only account for the delta (e.g., newly added advertisement content) and avoid redundant training. Ideally, the coefficients should be retrained as frequently as possible because the random effects of the GAME models are sensitive to the retrain frequency, especially for new advertisers or creatives that have not been seen previously. However, since the incremental loss formulation is an approximation, the error can propagate and make the model worse. Thus, it is important to find the sweet spot where the recommendation system 216 benefits from updating the recommendation model more frequently, but does not go through too many slices of incremental updates before the offline model refreshes. The recommendation system 216 may use offline batch model training for $\Omega^{(0)}$ and online model serving.

Offline batch model training for $\Omega^{(0)}$ involves training an initial GAME model, $\beta*^{(0)}=[\beta*_f^{(0)},\{\beta*_r^{(0)}\}_{r \in R}]$. In one embodiment, the recommendation system 216 trains a GAME model $\Omega^{(0)}$ over a training window of T days (e.g., 14-30 days, depending on naturally occurring periodicity). Since $\beta_f^{(0)}$ represents a generalized fixed-effect model learned across a complete dataset, it is tolerant to minor data shifts and can be updated less frequently (e.g., once every d days). However, new items get added to the system constantly and item-specific behaviors are fast changing. Therefore, $\{B_r\}_{r \in R}$ has to be updated frequently, every h hours (e.g., 6-8 hours) to capture these changes.

In some example embodiments, for each training cadence of d days, the recommendation system 216 starts fresh and train $\beta*^{(0)}$ $[\beta_f^{(0)},\{\beta*_r^{(0)}\}_{r \in R}]$ on the observations data $\Omega^{(0)}$ collected over training window T by solving the following equation:

$$\underset{\beta=[\beta_f,B]}{\text{minimize}} \sum_{n \in \Omega} -\log p(y_n \mid s_n) - \log p(\beta_f) - \sum_{r \in R} \sum_{l=1}^{N_r} \log p(\beta_{rl}).$$

Turning to the online model serving component, the training data has varying amount of samples for different random-effects resulting in different covariance estimates for $\beta_r$'s. The recommendation system 216 may use a Thompson Sampling scheme to incorporate these covariance estimates in online inference. For each of the random-effects coefficients, the recommendation system 216 may use the posterior mean $\beta^*_r{}^{(O)}$, and the variance $\Sigma^*_r{}^{(O)}$ to sample a $\beta_r$ for online inference and serving.

Figure 10:
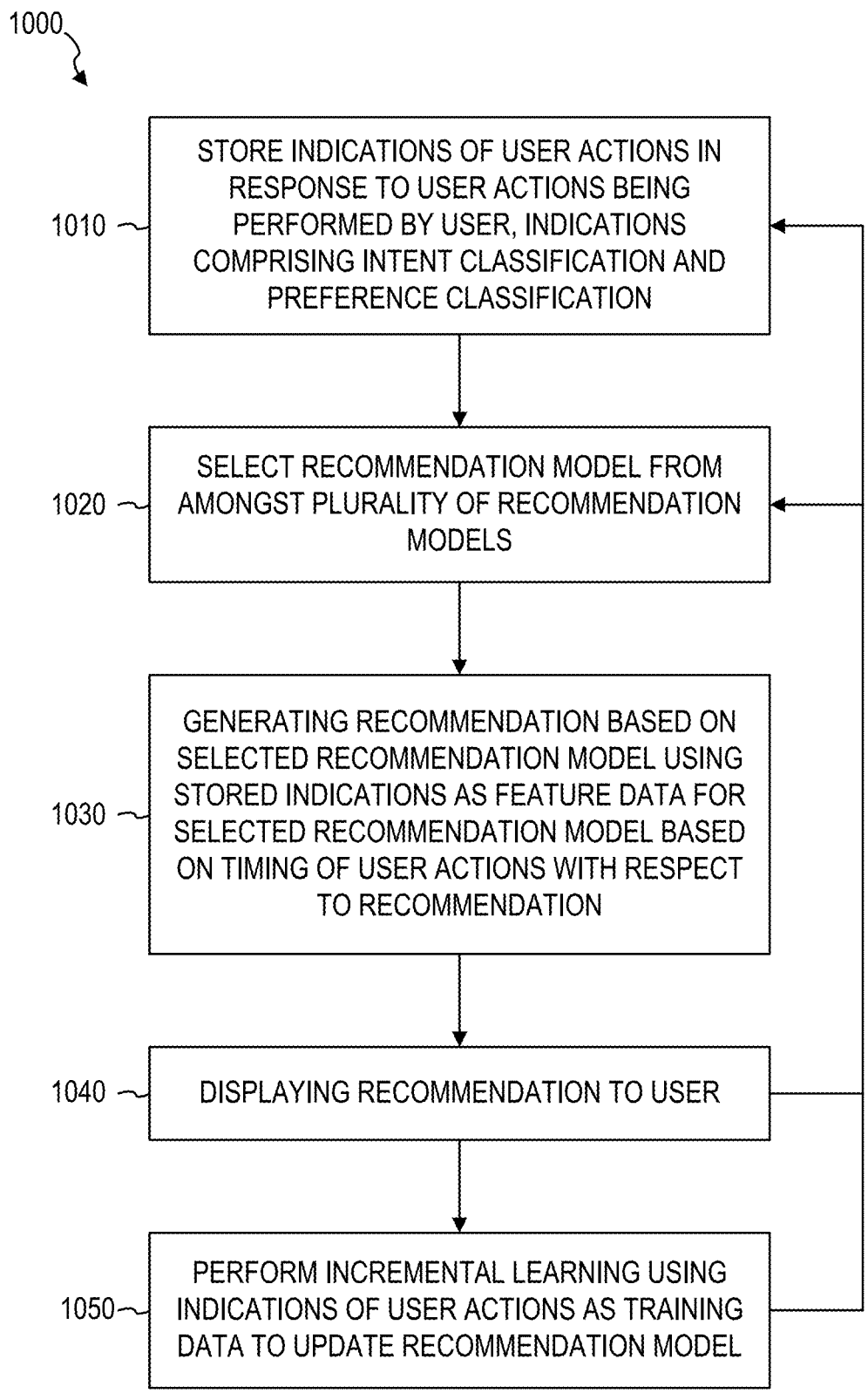
FIG. 10 is a flowchart illustrating a method of providing recommendations, in accordance with an example embodiment.

FIG. 10 is a flowchart illustrating a method of providing recommendations, in accordance with an example embodiment. The method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the recommendation system 216 of FIGS. 2, 3, and 8, as described above.

At operation 1010, the recommendation system 216, for each one of a plurality of user actions performed on an online service by a user via a computing device of the user, stores a corresponding indication of the user action in response to the user action being performed. In some example embodiments, the corresponding indication for each user action comprises an intent classification and a preference classification for the corresponding user action. The intent classification identifies an activity of the user and corresponds to different types of user actions, whereas the preference classification identifies a target of the activity. The intent classification may comprise an activity that the user performed or attempted to perform via one or more types of user actions, thus representing an intended activity of the user. For example, one intent classification may be finding a job, which may correspond to the user actions of viewing an online job posting, saving an online job posting, and applying to an online job posting. In some example embodiments, the plurality of user actions comprise at least one of posting a comment for a digital content item posted by another user, sending an invitation to connect to another user, following another user, submitting an electronic like of a digital content item posted by another user, sharing a digital content item posted by another user, sending a message to another user, viewing an online job posting via the online service, and applying to an online job posting via the online service. However, other types of user actions are also within the scope of the present disclosure.

In some example embodiments, the storing of the corresponding indication of the user action comprises selecting the corresponding intent classification from a plurality of intent classifications based on the corresponding user action. The plurality of intent classifications may comprise building a social network, finding a job, staying informed, and nurturing a relationship. However, the plurality of intent classifications may comprise other configurations of intent classifications. In some example embodiments, the storing of the corresponding indication of the user action comprises selecting the corresponding preference classification from a plurality of preference classifications based on the corresponding user action. The plurality of preference classifications may comprise another user of the online service, a type of job, a specific company, a type of company, an industry, and a geographic location. However, the plurality of preference classifications may comprise other configurations of preference classifications.

At operation 1020, the recommendation system 216 selects, from amongst a plurality of recommendations models of the online service, a first recommendation model to use in generating a recommendation for the user. For example, the plurality of recommendation models may comprise a model configured to be used to generate recommendations of digital content items to be displayed within a personalized feed of the user on the home page, another model configured to be used to generate recommendations of other users with whom to form connections, and yet another model configured to be used to generate recommendations of online job postings. In some example embodiments, the recommendation system 216 selects the recommendation model based on an identification of a particular page or user interface module (e.g., a particular bounded area within a page dedicated to display of a particular type of recommendation) in which the recommendation is to be provided.

At operation 1030, the recommendation system 216 generates, at a first point in time, a recommendation of a first type based on the selected first recommendation model. In some example embodiments, the generating of the first recommendation comprises using the stored indications of the plurality of user actions as feature data for the first recommendation model based on the plurality of user actions having been performed within a threshold amount of time before the first point in time. For example, the recommendation system 216 may filter out any indications of user actions not performed within the last 24 hours, and then use only the indication user actions performed within the last 24 hours as feature data for the first recommendation model in generating the recommendation.

At operation 1040, the recommendation system 216 causes the first recommendation to be displayed on the computing device. In some example embodiments, the causing the first recommendation to be displayed on the computing device comprises causing the first recommendation to be displayed on a first page of the online service. For example, the first recommendation may be displayed on a home page of the online service displayed on the computing device of the user in response to the user logging onto the online service (e.g. on the home page shown in FIG. 4) or on any page that is navigated to from the home page via selection by the user of at least one selectable link, such as a connection recommendation page (e.g., on the connection recommendation page shown in FIG. 5) or a job recommendation page (e.g., on the job recommendation page shown in FIG. 6).

The method 1000 may return to operation 1010 to store one or more additional indications of user actions performed by the user via the online service since the previous performance of operation 1010. The method 1000 may, again, select a recommendation model at operation 1020, such as by selecting a different recommendation model than previously selected in the preceding performance of operation 1020, and then, at operation 1030, generate a recommendation using the newly-selected recommendation model and the most recent version of stored indications of user actions. This subsequent recommendation may be a recommendation of a different type than the recommendation of the previous performance of operation 1030. In one example, a connection recommendation is generated during the previous performance of operation 1030 in the preceding cycle of the method 1000 (e.g., at a first point in time), and a job recommendation is generated during the current performance of operation 1030 in the current cycle of the method 1000 (e.g., at a second point in time after the first point in time, such as 10 minutes after the first point in time). The recommendation system 216 then causes the newly-generated recommendation to be displayed on the computing device of the user.

At operation 1050, the recommendation system 216 modifies one of the recommendation models using the corresponding indications of the plurality of user actions as training data in an incremental learning process. In some example embodiments, the recommendation model comprises a fixed-effects model and a random-effects model, and the incremental learning process comprises modifying the random-effects model. The modifying of the recommendation model may comprise receiving the corresponding indications of the plurality of user actions as streaming data, determining that the streaming data of the corresponding indications of the plurality of user actions satisfies a minimum threshold amount of data, and triggering the incremental learning process based on the determining that the streaming data of the corresponding indications satisfies the minimum threshold amount of data, with the corresponding indications of the plurality of user actions being used as a batch of training data in the incremental learning process. In some example embodiments, the incremental learning algorithm in FIG. 9, which was previously discussed above, is used to modify the recommendation model. However, other incremental learning algorithms may be used to modify the recommendation model.

It is contemplated that any of the other features described within the present disclosure can be incorporated into the method 1000.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 11:
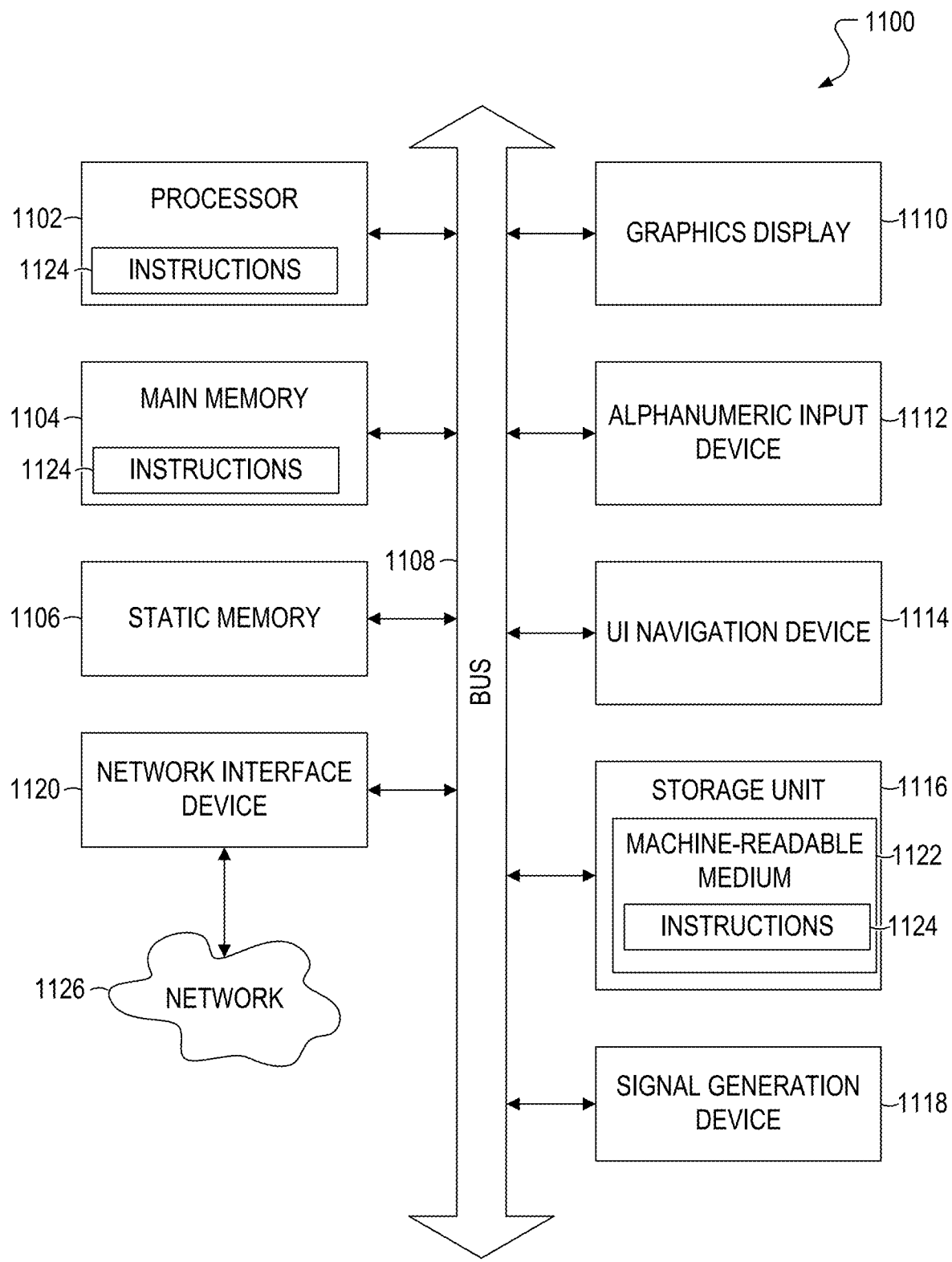
FIG. 11 is a block diagram of an example computer system on which methodologies described herein may be executed, in accordance with an example embodiment.

FIG. 11 is a block diagram of an example computer system 1100 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a graphics display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation device 1114 (e.g., a mouse), a storage unit 1116, a signal generation device 1118 (e.g., a speaker) and a network interface device 1120.

The storage unit 1116 includes a machine-readable medium 1122 on which is stored one or more sets of instructions 1122 and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding or carrying instructions (e.g., instructions 1124) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method performed by a computer system having at least one hardware processor, the computer-implemented method comprising:
    receiving a plurality of user actions performed on an online service by a user via a computing device of the user;
    generating a plurality of intent classifications corresponding to a plurality of different types of user actions, wherein at least one intent classification corresponds to two or more user actions;
    for at least one of the plurality of user actions:
        selecting an intent classification from the plurality of intent classifications according to a type of the user action, the selected intent classification identifying an intent of the user in performing the corresponding user action; and
        generating, according to the type of the user action, a preference classification identifying a target of the corresponding user action selected from a plurality of different user action targets;
    storing the intent classification and the preference classification for each one of the plurality of user actions;
    for each of a plurality of different types of user actions, storing a count of a number of occurrences of the corresponding type of user action found in the intent classifications for the plurality of user actions;
    generating, at a first point in time, a first recommendation of a first type based on a first recommendation model, the generating of the first recommendation comprising using the stored intent classifications and preference classifications of the plurality of user actions as feature data for the first recommendation model based on the plurality of user actions having been performed within a threshold amount of time before the first point in time;
    causing the first recommendation to be displayed on the computing device;
    generating, at a second point in time after the first point in time, a second recommendation of a second type different from the first type based on a second recommendation model different from the first recommendation model, the generating of the second recommendation comprising using the stored intent classifications and preference classifications of the plurality of user actions as feature data for the second recommendation model based on the plurality of user actions having been performed within the threshold amount of time before the second point in time; and
    causing the second recommendation to be displayed on the computing device.

2. The computer-implemented method of claim 1, wherein:
    the causing the first recommendation to be displayed on the computing device comprises causing the first recommendation to be displayed on a first page of the online service; and
    the causing the second recommendation to be displayed on the computing device comprises causing the second recommendation to be displayed on a second page of the online service, the second page being different from the first page.

3. The computer-implemented method of claim 2, wherein:
    the first page comprises a home page of the online service displayed on the computing device of the user in response to the user logging onto the online service; and
    the second page is navigated to from the home page via selection by the user of at least one selectable link.

4. The computer-implemented method of claim 1, wherein:
    the first recommendation model is used to generate recommendations of digital content items to be displayed within a personalized feed of the user on a home page; and
    the second recommendation model is configured to generate recommendations of other users with whom to form connections or recommendations of online job postings.

5. The computer-implemented method of claim 1, wherein the plurality of user actions comprise at least one of: posting a comment for a digital content item posted by another user, sending an invitation to connect to another user, following another user, submitting an electronic like of a digital content item posted by another user, sharing a digital content item posted by another user, sending a message to another user, viewing an online job posting via the online service, or applying to an online job posting via the online service.

6. The computer-implemented method of claim 1, wherein the storing comprises selecting the corresponding intent classification from a plurality of intent classifications based on the corresponding user action, the plurality of intent classifications comprising: building a social network, finding a job, staying informed, or nurturing a relationship.

7. The computer-implemented method of claim 1, wherein the storing comprises selecting the corresponding preference classification from a plurality of preference classifications based on the corresponding user action, the plurality of preference classifications comprising: another user of the online service, a type of job, a specific company, a type of company, an industry, or a geographic location.

8. A system comprising:
    at least one hardware processor; and
    a non-transitory machine-readable medium embodying a set of instructions that, when executed by the at least one hardware processor, cause the at least one hardware processor to perform operations, the operations comprising:
        receiving a plurality of user actions performed on an online service by a user via a computing device of the user;
        generating a plurality of intent classifications corresponding to a plurality of different types of user actions, wherein at least one intent classification corresponds to two or more user actions;
        for at least one of the plurality of user actions;
            selecting an intent classification from the plurality of intent classifications according to a type of the user action, the selected intent classification identifying an intent of the user in performing the corresponding user action; and generating, according to the type of the user action, a preference classification identifying a target of the corresponding user action selected from a plurality of different user action targets;

storing the intent classification and the preference classification for each one of the plurality of user actions;

for each of a plurality of different types of user actions, storing a count of a number of occurrences of the corresponding type of user action found in the intent classifications for the plurality of user actions;

generating, at a first point in time, a first recommendation of a first type based on a first recommendation model, the generating of the first recommendation comprising using the stored intent classifications and preference classifications of the plurality of user actions as feature data for the first recommendation model based on the plurality of user actions having been performed within a threshold amount of time before the first point in time;

causing the first recommendation to be displayed on the computing device;

generating, at a second point in time after the first point in time, a second recommendation of a second type different from the first type based on a second recommendation model different from the first recommendation model, the generating of the second recommendation comprising using the stored intent classifications and preference classifications of the plurality of user actions as feature data for the second recommendation model based on the plurality of user actions having been performed within the threshold amount of time before the second point in time; and causing the second recommendation to be displayed on the computing device.

9. The system of claim 8, wherein:

the causing the first recommendation to be displayed on the computing device comprises causing the first recommendation to be displayed on a first page of the online service; and the causing the second recommendation to be displayed on the computing device comprises causing the second recommendation to be displayed on a second page of the online service, the second page being different from the first page.

10. The system of claim 9, wherein:

the first page comprises a home page of the online service displayed on the computing device of the user in response to the user logging onto the online service; and the second page is navigated to from the home page via selection by the user of at least one selectable link.

11. The system of claim 8, wherein the plurality of user actions comprise at least one of: posting a comment for a digital content item posted by another user, sending an invitation to connect to another user, following another user, submitting an electronic like of a digital content item posted by another user, sharing a digital content item posted by another user, sending a message to another user, viewing an online job posting via the online service, or applying to an online job posting via the online service.

12. The system of claim 8, wherein the storing comprises selecting the corresponding intent classification from a plurality of intent classifications based on the corresponding user action, the plurality of intent classifications comprising: building a social network, finding a job, staying informed, or nurturing a relationship.

13. The system of claim 8, wherein the storing comprises selecting the corresponding preference classification from a plurality of preference classifications based on the corresponding user action, the plurality of preference classifications comprising: another user of the online service, a type of job, a specific company, a type of company, an industry, or a geographic location.

14. A non-transitory machine-readable medium embodying a set of instructions that, when executed by at least one hardware processor, cause the at least one hardware processor to perform operations, the operations comprising:

receiving a plurality of user actions performed on an online service by a user via a computing device of the user;

generating a plurality of intent classifications corresponding to a plurality of different types of user actions, wherein at least one intent classification corresponds to two or more user actions;

for at last one of the plurality of user actions;

selecting an intent classification from the plurality of intent classifications according to a type of the user action, the selected intent classification identifying an intent of the user in performing the corresponding user action; and generating, according to the type of the user action, a preference classification identifying a target of the corresponding user action selected from a plurality of different user action targets;

storing the intent classification and the preference classification for each one of the plurality of user actions;

for each of a plurality of different types of user actions, storing a count of a number of occurrences of the corresponding type of user action found in the intent classifications for the plurality of user actions;

generating, at a first point in time, a first recommendation of a first type based on a first recommendation model, the generating of the first recommendation comprising using the stored intent classifications and preference classifications of the plurality of user actions as feature data for the first recommendation model based on the plurality of user actions having been performed within a threshold amount of time before the first point in time;

causing the first recommendation to be displayed on the computing device;

generating, at a second point in time after the first point in time, a second recommendation of a second type different from the first type based on a second recommendation model different from the first recommendation model, the generating of the second recommendation comprising using the stored intent classifications and preference classifications of the plurality of user actions as feature data for the second recommendation model based on the plurality of user actions having been performed within the threshold amount of time before the second point in time; and causing the second recommendation to be displayed on the computing device.

15. The computer-implemented method of claim 1, wherein the operations further comprise:

modifying at least one of the recommendation models using corresponding indications of the plurality of user actions as training data in an incremental learning process.

16. The computer-implemented method of claim 15, wherein the first recommendation model comprises a fixed-effects model and the second recommendation model comprises a random-effects model, and the incremental learning process comprises modifying the random-effects model.

17. The computer-implemented method of claim 15, wherein the modifying at least one of the recommendation models comprises:
- receiving the corresponding indications of the plurality of user actions as streaming data;
- determining that the streaming data of the corresponding indications of the plurality of user actions satisfies a minimum threshold amount of data; and
- triggering the incremental learning process based on the determining that the streaming data of the corresponding indications satisfies the minimum threshold amount of data, the corresponding indications of the plurality of user actions being used as a batch of training data in the incremental learning process.

18. The system of claim 8, wherein the operations further comprise modifying at least one of the recommendation models using corresponding indications of the plurality of user actions as training data in an incremental learning process.

19. The system of claim 18, wherein the first recommendation model comprises a fixed-effects model and the second recommendation model comprises a random-effects model, and the incremental learning process comprises modifying the random-effects model.

20. The system of claim 18, wherein the modifying at least one of the recommendation models comprises:
- receiving the corresponding indications of the plurality of user actions as streaming data;
- determining that the streaming data of the corresponding indications of the plurality of user actions satisfies a minimum threshold amount of data; and triggering the incremental learning process based on the determining that the streaming data of the corresponding indications satisfies the minimum threshold amount of data, the corresponding indications of the plurality of user actions being used as a batch of training data in the incremental learning process.

* * * * *